United States Patent [19]

Utsumi et al.

[11] 4,429,565
[45] Feb. 7, 1984

[54] KNOCKING DETECTING APPARATUS FOR AN INTERNAL COMBUSTION ENGINE

[75] Inventors: Hiroo Utsumi; Yukio Sakakibara; Teruyoshi Ito, all of Kariya; Toshiharu Iwata, Aichi; Jun Ohta, Nagoya; Kiyokane Kazi, Toyota; Osamu Hori, Toyota; Mitsuyuki Banno, Toyota, all of Japan

[73] Assignees: Toyota Jidosha Kogyo Kabushiki Kaisha, Toyota; Nippondenso Co., Ltd., Kariya, both of Japan

[21] Appl. No.: 252,001

[22] Filed: Apr. 7, 1981

[30] Foreign Application Priority Data

Apr. 9, 1980 [JP]   Japan .............................. 55-48002[U]

[51] Int. Cl.³ .............................................. G01L 23/22
[52] U.S. Cl. ........................................................ 73/35
[58] Field of Search ..................... 73/35; 123/425, 435

[56] References Cited

U.S. PATENT DOCUMENTS 4,002,155  1/1977  Harned et al. .................. 123/425
4,279,143  7/1981  Guipaud ................................ 73/35

*Primary Examiner*—James J. Gill
*Attorney, Agent, or Firm*—Cushman, Darby & Cushman

[57] ABSTRACT

A knocking detecting apparatus for an internal combustion engine with a knocking detector for detecting a factor of knocking in the engine and a circuit for generating a knocking discrimination level in response to the output signal of the knocking detector, for detecting knocking by comparing the output signal of the knocking detector and the knocking discrimination level. The knocking detecting apparatus comprises a circuit for clamping the output of the knocking discrimination level generator circuit such that the knocking discrimination level does not exceed a predetermined voltage.

6 Claims, 7 Drawing Figures

KNOCKING DETECTING APPARATUS FOR AN INTERNAL COMBUSTION ENGINE

BACKGROUND OF THE INVENTION

This invention relates to a knocking detecting apparatus for an internal combustion engine which enables to perform an accurate detection of trace knock through provision of a clamp circuit.

In a conventional knocking detecting apparatus shown in FIG. 1, a signal 5 which is detected by a knocking detector (knock sensor) 1 passes through an input circuit 2 including a filter etc. and becomes the one input signal 7 of a comparator circuit 4, while at the same time it is applied to a discrimination level generator circuit 3 which generates a knocking discrimination level 6 as the other input of the comparator 4. When the signal 7 is larger than the signal 6, the comparator 4 generates a knock signal 8.

However, in such a prior art constitution as described above, the input signal 7 of the comparator 4 increases in accordance with the increase of the number of revolutions N of the engine, as shown by numerals 71, 72 and 73 in FIG. 3, where 71 denotes a noise level in the absence of knocking, 72 denotes a trace knock level, and 73 denotes a light knock level. We define here a trace knock as a knock state which can be barely heard by human ear, while a light knock as a knock state which can be clearly heard by human ear. The knocking discrimination level 6 increases also in accordance with the increase of the number of revolutions N of the engine, as shown by 61 in FIG. 3. A poor adjustment of tappet clearance may result in valve-down, etc., and noise due to the valve-down, that is, the noise which may occur by the closure of intake and exhaust valve of a cylinder which is other than the cylinder in which the ignition occurs, and other noises lead to an increase in the noise level. As a result, it may occur that in the high speed rotation region of the engine the knocking discrimination level 6 exceeds the trace knock level as shown by a curve ①-①'. In such a case a problem that generation of trace knock can not be detected may occur. Furthermore, it may occur that operational amplifiers used in the filter of input circuit 2 and operational amplifiers used in the amplifier of knocking discrimination level generator circuit 3 are of different kind and hence have different saturation voltages, or that they are of the same kind but have variation in their saturation voltages and the filter saturates at a lower voltage. In such cases, if the sensitivity of the knock sensor 1 is extremely large, the signal 7 having passed through the filter of the input circuit 2 may saturate at a voltage lower than the knocking discrimination level 6 denoted by 61 in FIG. 4, as shown by the trace knock level 72 in FIG. 4, and this causes a problem that the knocking detection cannot be made.

SUMMARY OF THE INVENTION

An object of this invention is to solve the above-mentioned problems and to provide a knocking detecting apparatus for an internal combustion engine capable of detecting the trace knock by letting a clamp circuit connect with a knocking discriminating level generator circuit.

By the circuit construction of this invention, even if the knocking discrimination level 6 increases abnormally in the high speed rotation region of the engine as shown by the broken curve ①-①' in FIG. 3, by setting an appropriate clamp level ②-②' it becomes possible to detect the trace knock.

Furthermore, even when the output of filter 7 saturates at a voltage lower than the knocking discrimination level 6 as shown by a trace knock level 72 in FIG. 4, the detection of knocking is possible by setting an appropriate clamp level ③-③'.

Through a combination of the knocking detecting means for an internal combustion engine of this invention and an ignition time control means which delays the ignition time when a knocking occurs, improvement of engine output and fuel consumption is ensured.

DESCRIPTION OF PREFERRED EMBODIMENTS

The invention will be explained hereinafter with reference to embodiments shown in figures.

Figure 1:
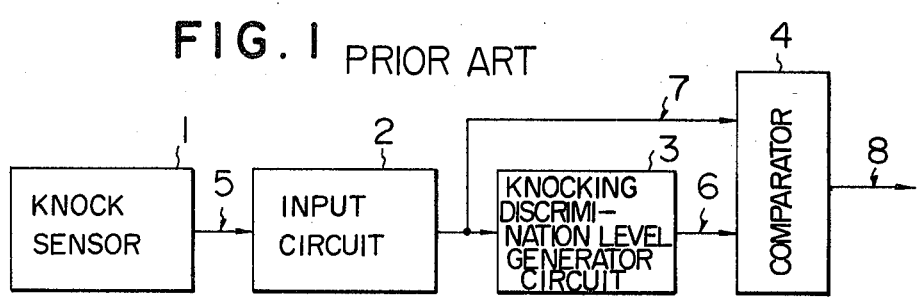
FIG. 1 shows a block diagram of a conventional apparatus.
Figure 2:
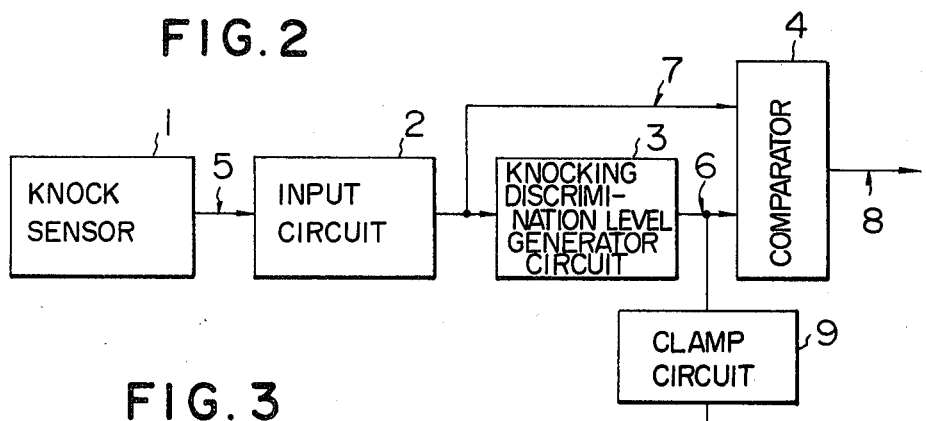
FIG. 2 shows a block diagram of an apparatus according to one embodiment of this invention.

In FIG. 2, a reference numeral 1 denotes a knock sensor for detecting a factor of knocking such as vibration, sound and combustion pressure, etc., which may be a vibration detector fixed on a cylinder block of an internal combustion engine to detect vibration. 2 denotes an input circuit which receives the vibration output of the knock sensor 1 and generates an output signal in response to the vibration due to knocking. 3 denotes a knocking discrimination level generator circuit which generates a knocking discrimination level from the output signal of the circuit 2, which output signal is responsive to the knocking vibration. 4 denotes a comparator which compares the output signal of the input circuit 2 with the knocking discrimination level from the circuit 3 and generates a knocking pulse when the former output signal exceeds the latter level. 9 denotes a clamp circuit which limits the level of the knocking discrimination level generator circuit 3 below a predetermined voltage. It is so arranged that, as well known, when a knocking pulse is generated in the comparator 4, an ignition time control means is controlled in such a manner that the ignition time is delayed.

Figure 5:
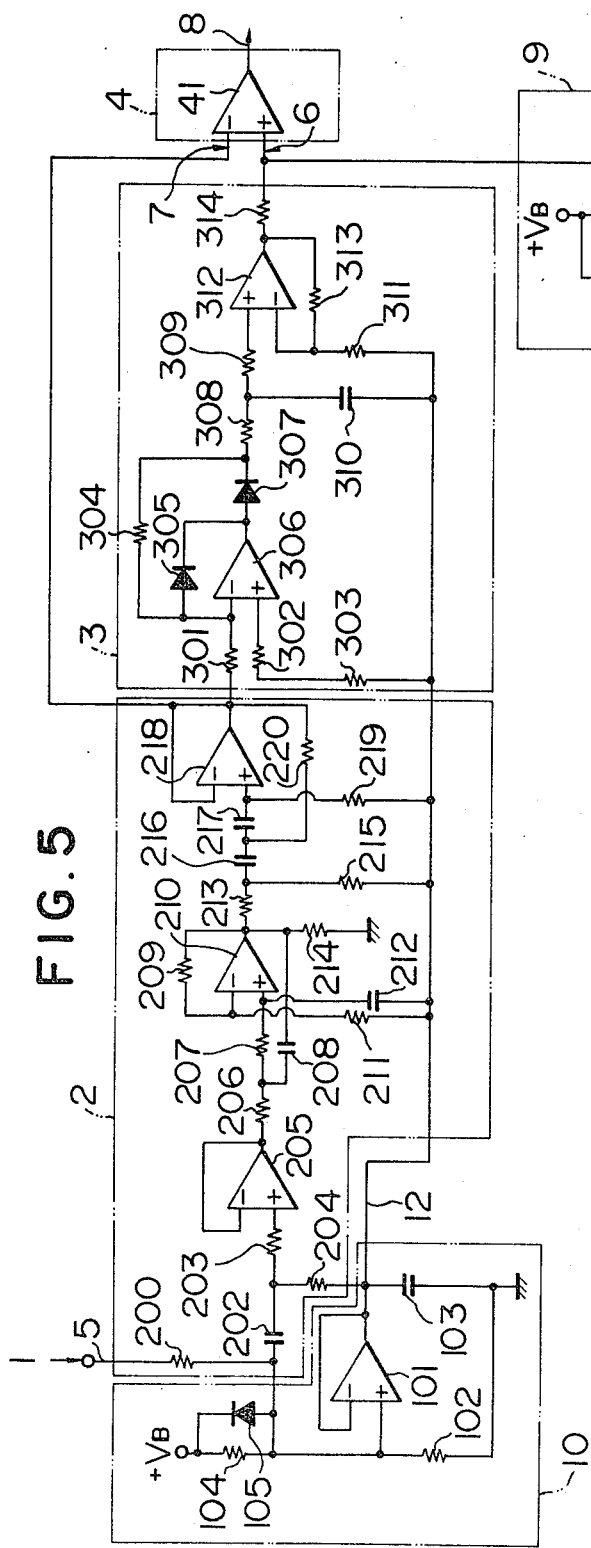
FIG. 5 shows a detailed electric circuit diagram of the apparatus of FIG. 2.

Next, detailed explanation will be made as to the embodiment shown in FIG. 5. A reference numeral 10 denotes a reference voltage generating circuit (omitted in the apparatus shown in FIG. 2), which are constituted with resistors 102 and 104, a capacitor 103, a diode 105 and an operational amplifier 101. A power supply voltage $+V_B$ is applied to one end of the resistor 104 to generate a reference potential 12 for each circuit. The input circuit 2 comprises an input part constituted with a resistor 200 and a condenser 202; a voltage follower constituted with resistors 203 and 204 and an operational amplifier 205; a low pass filter constituted with resistors 206, 207, 209, 211, 213, 214 and 215, capacitors 208 and 212 and an operational amplifier 210; and a high pass filter constituted with resistors 219 and 220, capacitors 216 and 217 and an operational amplifier 218. Out of the signal inputted from the knock sensor 1, only a component within the knocking frequency range is outputted. The knocking discrimination level generator circuit 3 comprises a half wave rectifier circuit formed by resistors 301, 302, 303 and 304, diodes 305 and 307 and an operational amplifier 306; an integrating circuit formed by a resistor 308 and a capacitor 310; and an amplifier circuit constituted with resistors 309, 311, 313 and 314 and an operational amplifier 312. A signal from the input circuit 2 is rectified, integrated and amplified by a prescribed factor, and is outputted as a knocking discrimination level. The comparator 4 is constituted with an operational amplifier 41. The clamp circuit 9 is constituted with resistors 91, 92 and 95 and transistors 93 and 94. The power supply voltage $+V_B$ is applied to the collector of the transistor 93, the base of which is connected to a voltage division point of resistors 91 and 92. A signal on the voltage division point is current-amplified by the transistor 93. The emitter voltage of the transistor 93 is fixed at the voltage on the voltage division point. When the emitter voltage of the transistor 94 whose base is connected with the emitter of the transistor 93, that is, the voltage of the knocking discrimination level 6, exceeds the emitter potential of the transistor 93, the transistor 94 becomes conductive. As a result, the knocking discrimination level 6 is clamped at the potential on the voltage division point of resistors 91 and 92.

Next, the operation in the above construction will be described. When the signal 5 detected by the knock sensor 1 enters the input circuit 2, it is impedance changed by the voltage follower of the circuit 2, and noise whose frequency component is different from that of the knock signal is eliminated by both low pass and high pass filters to yield an output signal 7. This signal becomes a negative side input of the comparator, while it enters the knocking discrimination level generator circuit 3 and is half wave rectified, integrated and amplified therein to become a knocking discrimination level 6 and also a positive side input to the comparator 4.

Figure 3:
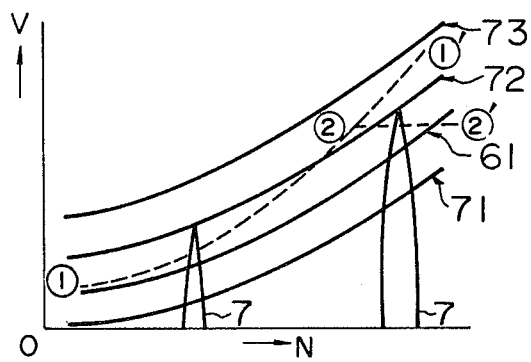
FIGS. 3 and 4 are characteristic diagrams showing a relation between the number of revolutions N of the engine and input signals which are compared in comparators of the apparatus shown in FIGS. 1 and 2.

When the signal 7 at the negative input of the comparator is larger than the signal 6 at the positive input, a negative-going knock signal 8 is generated. Even if the knocking discrimination level 6 increased unusually due to valve-down noise as shown by the broken curve in FIG. 3, it is clamped at a prescribed voltage, as shown by the broken curve ②-②' in FIG. 3, by the clamp circuit 9 which is connected with the knocking discrimination level generator circuit, therefore, it becomes possible to make an accurate detection of knocking.

Figure 4:
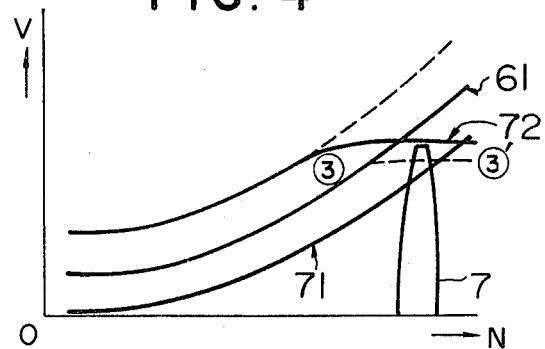

In addition, when operational amplifiers 210 and 218 used in the filter of input circuit 2 and operational amplifiers 306 and 312 used in the knocking discrimination level generator circuit 3 are of different kind and have different saturation voltages, or when they are of the same kind but there is variation in their saturation voltages, and the filter saturates at a lower voltage, even if the sensitivity of the knock sensor 1 is extremely large, the knocking discrimination level 6 is clamped by the clamp circuit 9 at a voltage, as shown by the broken curve ③-③' in FIG. 4, which is lower than the level of signal 7 having passed through the filter having a trace knock level as shown by 72 in FIG. 4. Thus, it becomes possible to make a detection of the trace knock.

Figure 7:
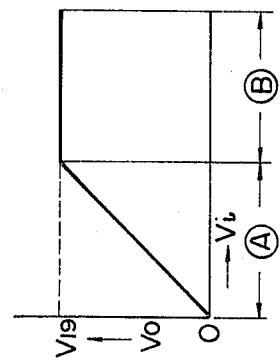
FIG. 7 is a characteristic diagram of the circuit of FIG. 6.
Figure 6:
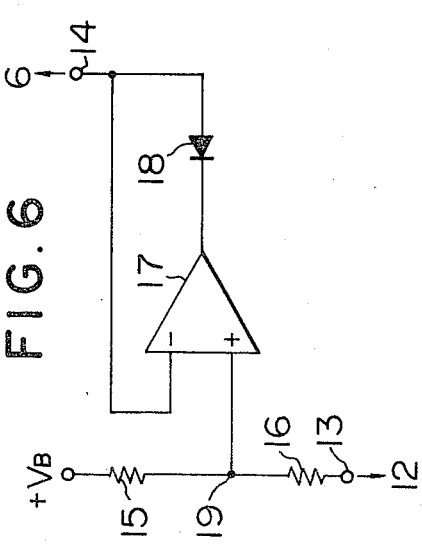
FIG. 6 shows an electric circuit diagram of a clamp circuit according to another embodiment.

FIG. 6 shows a clamp circuit 9 according to another embodiment of this invention. This clamp circuit is composed of an operational amplifier 17, two resistors 15 and 16 connected in series with each other, and a diode 18. A terminal 13 is connected to a reference voltage 12, while another terminal 14 is connected to the non-inverting input of the comparator 4. A power supply voltage $+V_B$ is applied to one end of the resistor 15. The characteristic of this circuit is shown in FIG. 7. When the voltage $V_i$ which is applied to the terminal 14, or the input voltage from the knocking discrimination level 6, is smaller than the voltage $V_{19}$ at a voltage division point 19 of the resistors 15 and 16, the output voltage of the operational amplifier 17 becomes higher than the voltage at the terminal 14. Therefore, the diode 18 is off and the voltage $V_o$ appearing at the terminal 14 becomes the same as the knocking discrimination level 6 (region Ⓐ as shown in FIG. 7). When the voltage $V_i$ applied at the terminal 14 is larger than the voltage $V_{19}$, the voltage at the terminal 14 becomes higher than the output voltage of the operational amplifier 17. Therefore, the diode 18 becomes on, and the voltage $V_o$ at the terminal 14 is clamped at the potential $V_{19}$ (region Ⓑ as shown in FIG. 7). Thus, the knocking discrimination level 6 is clamped at the potential $V_{19}$ at the voltage division point 19 of the resistors 15 and 16.

We claim:

1. A knocking detecting apparatus for an internal combustion engine comprising:
   knocking detector means for detecting a factor of knocking in the internal combustion engine and generating an output signal,
   generating means for generating a discrimination signal in response to the output signal of said knocking detector means,
   limiting means for limiting the discrimination signal from said detector means below a predetermined value at a high speed of said engine so as to enable the detection of a trace knock, and
   comparator means for comparing the output signal from said knocking detector means and the said discrimination signal limited by said limiting means to generate a pulse signal indicative of a knocking.

2. A knocking detecting apparatus for an internal combustion engine comprising:
   knocking detector means for detecting a factor of knocking in the internal combustion engine and generating an output signal,
   generating means for generating a discrimination signal in response to the output signal of said knocking detector means,
   limiting means for limiting the discrimination signal from said detector means below a predetermined value, and
   comparator means for comparing the output signal from said knocking detector means and the said discrimination signal limited by said limiting means to generate a pulse signal indicative of a knocking,
   wherein said limiting means comprises:
   voltage division circuit means for dividing a power supply voltage to obtain said predetermined value,
   a first transistor for current-amplifying the output of said voltage division circuit means to produce a signal of said predetermined value, and
   a second transistor for limiting the discrimination signal of said generating means at the predetermined value produced by said voltage division circuit means, the base of said second transistor being connected to the output of said first transistor and the emitter of said second transistor being connected to the output of said generating means, said second transistor becoming conductive when said discrimination signal exceeds said predetermined value.

3. A knocking detecting apparatus for an internal combustion engine comprising:

knocking detector means for detecting a factor of knocking in the internal combustion engine and generating an output signal, generating means for generating a discrimination signal in response to the output signal of said knocking detector means, limiting means for limiting the discrimination signal from said detector means below a predetermined value, and comparator means for comparing the output signal from said knocking detector means and the said discrimination signal limited by said limiting means to generate a pulse signal indicative of a knocking, wherein said limiting means comprising:

voltage division circuit means for voltage-dividing a power supply voltage to generate said predetermined value, and an operational amplifier, a non-inverting input terminal of said amplifier being for receiving the output of said voltage division circuit means and an inverting input terminal of said amplifier being for receiving the output of said generating means, a diode connecting the output terminal of said amplifier to the output of said generating means, and wherein, when said discrimination signal is larger than said predetermined value, the output voltage of said operational amplifier becomes smaller than said discrimination signal and said diode becomes conducting to limit the output level of said generating means at the output voltage of said voltage division circuit means.

4. A knocking detection apparatus for an internal combustion engine comprising:

detector means for detecting a factor of knocking in the internal combustion engine and generating an output signal; and electronic circuit means for generating a discrimination signal in response to the output signal from said detector means including limiting the generated discrimination signal so that it does not exceed a predetermined value at a high speed region of said engine so as to enable the detection of a trace knock, means for comparing the limited discrimination signal with the output signal from said detector means, and means for generating a signal indicative of knocking in response to the result of the comparison.

5. A knocking detecting apparatus for an internal combustion engine comprising:

detector means for detecting a factor of knocking in an internal combustion engine and generating an output signal; and electronic circuit means for processing the output signal of said detector means, said electronic circuit means including filter means for passing predetermined frequency components from the output signal of said detector means, rectifying means for half-wave rectifying the signal passed through said filter means, integrating means for integrating the signal from said rectifying means to generate an integration signal, clamp means for limiting the integration signal so that it does not exceed a predetermined value at a high speed region of said engine so as to enable the detection of a trace knock, and comparator means for comparing the signal passed through said filter means and the signal limited by said clamp means.

6. A knocking detecting apparatus for an internal combustion engine comprising:

detector means for detecting a factor of knocking in an internal combustion engine and generating an output signal; and electronic circuit means for processing the output signal of said detector means, said electronic circuit means including filter means for passing predetermined frequency components from the output signal of said detector means, rectifying means for half-wave rectifying the signal passed through said filter means, integrating means for integrating the signal from said rectifying means to generate an integration signal, clamp means for limiting the integration signal so that it does not exceed a predetermined value, and comparator means for comparing the signal passed through said filter means and the signal limited by said clamp means, wherein said clamp means comprises a voltage division circuit for voltage-dividing a power supply voltage to generate said predetermined value, and an operational amplifier, a non-inverting input terminal of said operational amplifier being for receiving the output of said voltage division circuit and an inverting input terminal of said operational amplifier being for receiving the output of said integrating means, and the output terminal of said operational amplifier being connected to the output of said integrating means through a diode, and wherein, when said integration signal is larger than said predetermined value, the output of said operational amplifier becomes smaller than said integration signal and said diode becomes conductive thereby to limit the output level of said integrating means at the output voltage of said voltage division circuit.

* * * * *